July 17, 1973     P. A. CIRCELLI     3,746,600
HINGED PLUG-IN BRANCH ATTACHMENT
Filed Sept. 23, 1971
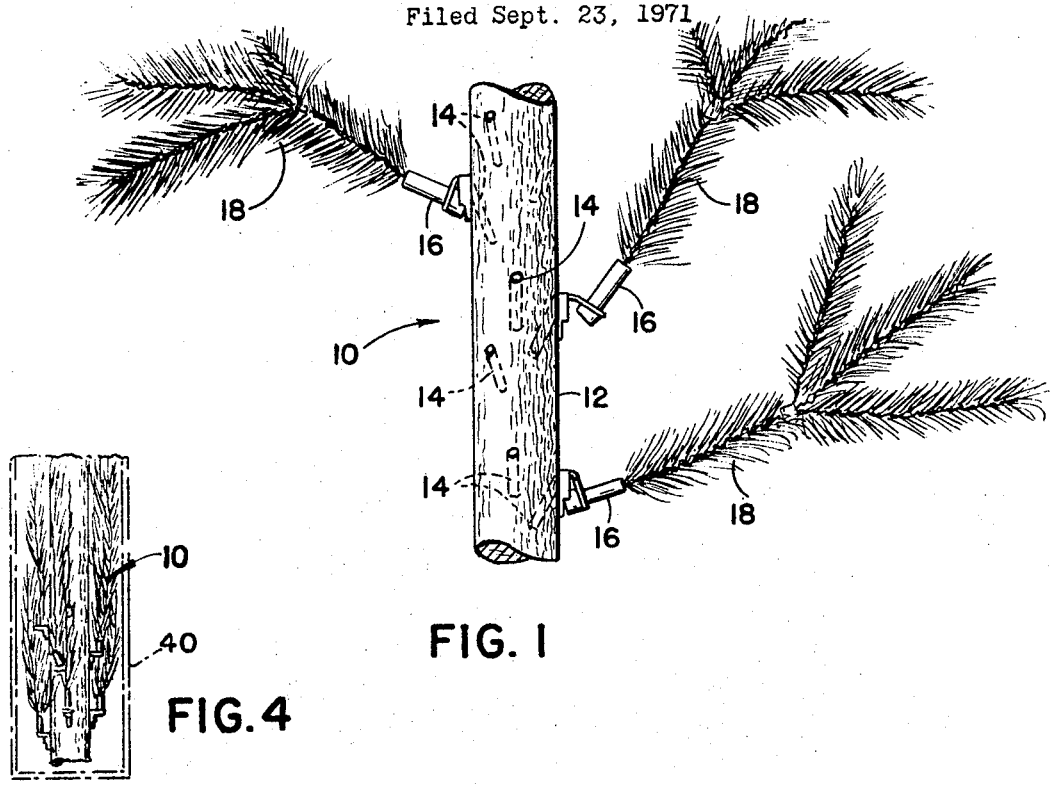
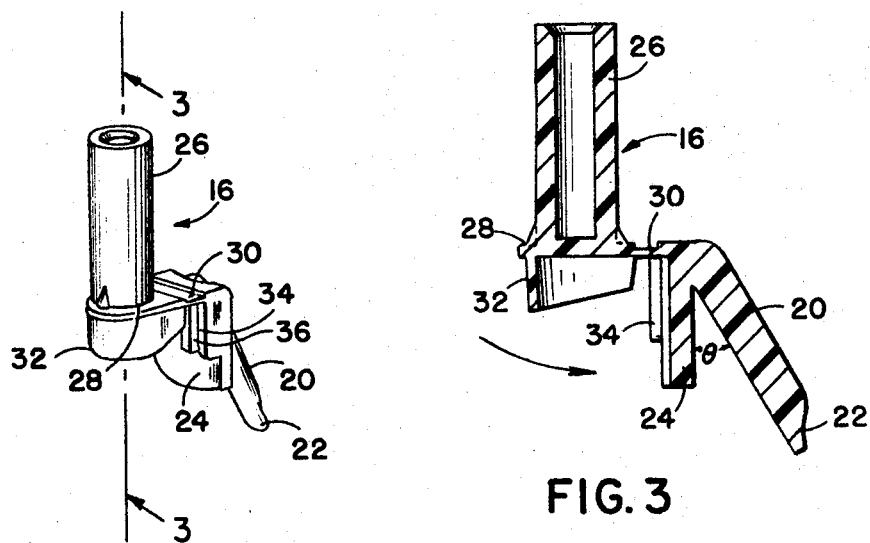
INVENTOR.
Peter A. Circelli
BY
Sandoe, Hopgood & Calimafde
ATTORNEYS

3,746,600
HINGED PLUG-IN BRANCH ATTACHMENT
Peter A. Circelli, Delmar, N.Y., assignor to American Technical Industries, Inc., Mount Vernon, N.Y.
Filed Sept. 23, 1971, Ser. No. 182,966
Int. Cl. A47g 33/06
U.S. Cl. 161—14                                6 Claims

ABSTRACT OF THE DISCLOSURE

A knock-down artificial Christmas tree includes a trunk portion having a plurality of downwardly and inwardly extending openings arranged about its periphery. Each hole receives a plug-in branch holder, which in turn includes a pin adapted for insertion into the opening, an arcuate plate connected to and forming an acute angle with that pin, and a tubular branch holder hingedly secured to the arcuate plate. The resulting artificial tree prevents undesired movement of the assembled branches, and also renders imperceptible the manner in which the branches are attached to the trunk.

---

The present invention relates generally to artificial trees, and more particularly to an improved artificial, knock-down Christmas tree.

In recent years the use of artificial Christmas trees in lieu of natural trees has significantly increased, primarily as a result of the reduced fire hazard and the increased convenience of use of the artificial trees. That is, artificial trees, because of their durability, can be stored between Christmas seasons and repeatedly reused during succeeding Christmas seasons.

To increase the convenience of their use artificial Christmas trees are commonly packaged and shipped in a knock-down form in which the trunk and branches are disassembled. The components of the tree are then assembled by the user, when desired, into the final decorative form simulating the appearance of a natural Christmas tree. For storage, following the Christmas season, the tree is disassembled into its several components to facilitate storage of the tree.

Several attempts have been made in the past to design collapsible or knock-down Christmas trees to enable storage of the tree without prior disassembly. One problem that has been encountered in almost all of these proposed designs is the lack of stability in the assembled branches. That is, in the collapsible Christmas trees presently commercially available, the branches are attached to the trunk in a relatively loose manner permitting undesirable lateral movement of the branches, particularly when the branch is accidentally touched or brushed against. Other difficulties that may be encountered in the known artificial Christmas trees include the complexity and cost of the branch attachment elements, and the fact that the branch holder may be clearly visible thus detracting from the natural quality of the tree's appearance.

In one such recently proposed branch holder construction, a plurality of tubular branch holders are supported by hinges on a ring that in turn is placed around the trunk circumference. Assembly of this tree, is, however, difficult, particularly in achieving the proper position of the ring to achieve optimum branch arrangement. Moreover, as noted above, the ring may be caused to shift its position about the trunk causing the branches to assume unnatural and unattractive orientations. In addition, the branch holder may be readily visible in the assembled tree to further detract from the appearance of the tree.

It is an object of the invention to provide an improved branch holder for an artificial Christmas tree or the like.

It is a further object of the invention to provide a Christmas tree branch holder which is more readily assembled to the tree, and which need not be disassembled for convenient storage of the tree during periods of nonuse.

It is another object of the invention to provide a branch holder of the type described in which undesired lateral movement of the branch with respect to the tree trunk is significantly limited.

It is yet a further object of the invention to provide a branch holder for an artificial Christmas tree or the like in which the means for supporting the tree branches is barely perceptible, thereby providing a more natural appearance of the assembled tree.

To this end, the artificial tree construction of the invention includes an upstanding trunk portion in which a plurality of downwardly and inwardly extending holes are formed about the trunk periphery. The branch holders are in the form of plug-in elements including a pin adapted to be inserted into the openings. Connected to the pin, and preferably forming an acute angle therewith, is an arcuate plate which seats vertically against the trunk when the pin is inserted into the trunk opening. That plate is effective to limit and practically prevent unwanted lateral movement of the branch holder along the trunk.

A tubular branch holder is connected to the upper end of the arcuate plate by means of a flexible hinge-like web which permits the branch holder to pivot with respect to the plate. The extent of that movement, which permits the tree to be folded during storage, is limited by ridges provided on the holder which cooperate with means formed on the plate.

To the accomplishment of the above and to such further objects as may hereinafter appear, the present invention relates to a hinged plug-in branch attachment for an artificial Christmas tree or the like, substantially as defined in the appended claims and as described in the following specification taken together with the accompanying drawing in which:

FIG. 1 is a fragmentary elevation of a trunk of an artificial tree with several branch holders being assembled to the trunk in accordance with the present invention;

FIG. 2 is a perspective illustration of one of the branch holders of the invention;

FIG. 3 is a cross-sectional view taken across line 3—3 of FIG. 2; and

FIG. 4 is an elevation of the tree with the branches shown in a folded condition for storing.

The artificial tree of the invention, generally designated 10 in FIG. 1, is of the type commonly employed as an artificial Christmas tree. As shown, that tree includes a trunk portion 12 which may be conveniently formed of wood or a suitable plastic material. A plurality of downwardly and inwardly extending openings 14 are formed at desired locations, as by drilling, about the outer periphery of trunk 12. In the assembled artificial tree, a branch holder attachment 16 is inserted into each opening 14 and in turn receives therein and holds an artificial branch or limb 18.

As shown best in FIGS. 2 and 3, branch holder attachment 16, which is preferably made of an integrally molded, single pieces of polyethylene or polypropylene, includes a pin 20 having a tapered lower end portion 22. The upper end of pin 20 is attached to an arcuate plate 24 and, as shown, defines an acute angle $\theta$ with that plate. That angle is substantially the same as the angle made between the axis of openings 14 and the longitudinal axis of trunk 12.

A tubular branch holder 26 is formed on a base 28, the latter in turn being connected to the upper end of arcuate plate 24 through a thin flexible web or hinge 30 which permits relative pivotal movement of branch holder 26 with respect to plate 24.

Depending from the lower surface of base 28 is a U-shaped collar 32. Two pair of ridges 34 (only one of which can be seen in FIG. 2) are formed on the rear surface of arcuate plate 24. A vertical space 36 is defined by each pair of ridges such that when tubular branch holder 26 is pivoted downward in the direction of the arrow in FIG. 3, the opposing vertical sides of collar 32 are respectively received within these recesses, thereby limiting both further downward and sideward movement of the branch holder.

In the initial assembly of the artificial tree of the invention, the trunk portion is mounted on a base (not shown). A branch 18 is inserted into the open end of each branch holder 26, and the lower end of pin 20 of the thus assembled attachments 16 is inserted into one of openings 14 in trunk portion 12. The weight of the branch causes the tubular holder to pivot downward about its hinge until collar 32 is received within the recesses formed in the arcuate plate as described above. In addition, when the pin is inserted into the trunk opening, the arcuate plate snugly seats against the trunk periphery thereby preventing lateral movement of the branch holder and branch about the trunk.

Thus, when assembled, the branches are securely attached to the trunk portion. Moreover, the branch holder attachment of the invention is barely perceptible in the assembled tree thereby enhancing the natural appearance of the assembled tree.

Upon the completion of the Christmas season, the tree of the invention need not be completely disassembled for storage. Rather, the trunk, after being removed from the base may be placed into an elongated carton or cylindrical tube 40 (FIG. 4). This will cause branch holders 26 to pivot upwards about hinges 30 into a folded or collapsed position against the trunk of the tree for storage in a reduced volume. To reuse the tree the following Christmas, the tree is simply removed from the carton at which time the branches automatically pivot about the hinges and return to their desired angular position with respect to the trunk portion.

It will thus be appreciated that the artificial tree of the invention provides greater ease of assembly as well as ease of storage and rigidity and security of branch attachment. Moreover, the branch holder attachments can be economically fabricated such as by injection molding techniques, and in addition, are practically imperceptible in the assembled tree.

While the invention has been herein specifically described with respect to only a single embodiment, it will be apparent that modifications can be made therein all without departing from the spirit and scope of the invention.

What is claimed is:

1. In an artificial Christmas tree or the like, a trunk portion having a plurality of openings extending downwardly and inwardly from the periphery toward the central longitudinal axis thereof, and a plurality of branch supporting elements adapted for mounting on said trunk portion, each of said branch supporting elements comprising a pin for insertion into one of said openings, an arcuate plate coupled to one end of said pin, the inner surface of said plate abutting against the periphery of said trunk portion when said pin is received in said opening, a tubular branch holder for releasably receiving the ends of branches, and a flexible hinge coupled between the lower end of said tubular member and said arcuate plate for permitting the relative pivotal movement of said tubular member with respect to said arcuate plate.

2. The artificial Christmas tree construction as defined in claim 1, in which said branch supporting element further comprises a substantially U-shaped collar depending from the lower end of said tubular branch holder and pivotable along with said tubular holder about said hinge from a free position, in which it is spaced from said arcuate plate, to a stop position in which it engages the rear surface of said arcuate plate, to thereby limit the further downward pivotal movement of said tubular holder.

3. The artificial Christmas tree construction as defined in claim 2, in which said branch supporting element further comprises first and second pairs of spaced parallel ridges formed on the rear surface of said arcuate plate, each of said pair of ridges defining a recess for respectively receiving opposed portions of said collar when the collar is in its said stop position.

4. The artificial Christmas tree of claim 1, in which said one end of said pin defines an acute angle with said arcuate plate, said angle being substantially equal to the angle defined between the axis of said opening and the longitudinal axis of said trunk portion.

5. The artificial Christmas tree construction as defined in claim 4, in which said branch supporting element further comprises a substantially U-shaped collar depending from the lower end of said tubular branch holder and pivotable along with said tubular holder about said hinge from a free position, in which it is spaced from said arcuate plate, to a stop position in which it engages the rear surface of said arcuate plate, to thereby limit the further downward pivoting of said tubular holder.

6. The artificial Christmas tree construction as defined in claim 5, in which said branch supporting element further comprises first and second pairs of spaced parallel ridges formed on the rear surface of said arcuate plate, each of said pair of ridges defining a recess for respectively receiving opposed portions of said collar when the collar is in its said stop position.

References Cited
UNITED STATES PATENTS

| | | | |
|---|---|---|---|
| 3,616,107 | 10/1971 | Kershner | 161—24 |
| 3,616,102 | 10/1971 | Baus et al. | 161—24 |
| 3,449,818 | 3/1970 | Kent | 161—22 |

GEORGE F. LESMES, Primary Examiner

P. J. THIBODEAU, Assistant Examiner

U.S. Cl. X.R.

161—17, 22, 23, 24; 248—27.8